(12) United States Patent
Zhang et al.

(10) Patent No.: US 7,960,054 B2
(45) Date of Patent: Jun. 14, 2011

(54) PACKAGED THIN FILM BATTERIES

(75) Inventors: Ji-Guang Zhang, Atlanta, GA (US); Eleston Maxie, Marietta, GA (US)

(73) Assignee: Excellatron Solid State LLC, Atlanta, GA (US)

( * ) Notice: Subject to any disclaimer, the term of this patent is extended or adjusted under 35 U.S.C. 154(b) by 1223 days.

(21) Appl. No.: 11/595,049

(22) Filed: Nov. 9, 2006

(65) Prior Publication Data

US 2007/0099078 A1    May 3, 2007

Related U.S. Application Data

(63) Continuation-in-part of application No. 10/047,407, filed on Jan. 10, 2002, now Pat. No. 7,204,862.

(51) Int. Cl.
*H01M 2/08* (2006.01)

(52) U.S. Cl. ......... 429/174; 429/162; 429/163; 429/185

(58) Field of Classification Search .................. 429/162, 429/163, 177, 185, 174
See application file for complete search history.

(56) References Cited

U.S. PATENT DOCUMENTS

| | | | |
|---|---|---|---|
| 3,237,078 A | 2/1966 | Mallory | |
| 3,393,355 A | 7/1968 | Whoriskey et al. | |
| 4,040,410 A | 8/1977 | Libowitz | |
| 4,049,877 A | 9/1977 | Sailant et al. | |
| 4,092,464 A | 5/1978 | Dey et al. | |
| 4,098,958 A | 7/1978 | Bettman | |
| 4,154,902 A | 5/1979 | Scwartz | |
| 4,303,877 A | 12/1981 | Meinhold | |
| 4,422,500 A | 12/1983 | Nishizaki et al. | |
| 4,523,635 A | 6/1985 | Nishizaki et al. | |
| 4,562,511 A | 12/1985 | Nishino et al. | |
| 4,614,905 A | 9/1986 | Petersson et al. | |
| 4,654,281 A | 3/1987 | Anderman et al. | |
| 4,677,038 A | 6/1987 | Salomon | |
| 4,692,390 A | 9/1987 | Roy | |
| 4,719,401 A | 1/1988 | Altmejd | |
| 4,781,029 A | 11/1988 | SerVaas | |
| 4,818,638 A | 4/1989 | Roy | |
| 4,996,129 A | 2/1991 | Tuck | |
| 5,139,895 A | 8/1992 | Roy et al. | |
| 5,270,635 A | 12/1993 | Hoffman et al. | |
| 5,291,116 A | 3/1994 | Feldstein | |

(Continued)

FOREIGN PATENT DOCUMENTS

EP    0 055 855    7/1982

(Continued)

OTHER PUBLICATIONS

Fragnaud et al.; Characterization of sprayed and sputter deposited LiCoO2 thin films for rechargeable microbatteries; (Journal of Power Sources 63 (1996) pp. 187-191).

(Continued)

*Primary Examiner* — Raymond Alejandro
(74) *Attorney, Agent, or Firm* — Baker Donelson; Dorian B. Kennedy

(57) ABSTRACT

A packaged battery (60) is provided having a thin film lithium battery cell (62) sealed with a packaging foil or layer (67). The battery cell (60) includes a substrate (61) and an active cell (62) with an anode current collector (65) and a cathode current collector (64). The packaged battery is produced by heat sealing a packaging foil (67) to the exterior surfaces of the active cell (62).

9 Claims, 4 Drawing Sheets

U.S. PATENT DOCUMENTS

| | | | |
|---|---|---|---|
| 5,306,577 A | 4/1994 | Sprouse | |
| 5,314,765 A | 5/1994 | Bates | |
| 5,336,573 A | 8/1994 | Zuckerbrod et al. | |
| 5,338,625 A | 8/1994 | Bates et al. | |
| 5,362,581 A | 11/1994 | Chang et al. | |
| 5,387,857 A | 2/1995 | Honda et al. | |
| 5,411,592 A | 5/1995 | Ovshinsky et al. | |
| 5,436,091 A | 7/1995 | Shackle et al. | |
| 5,445,906 A | 8/1995 | Hobson et al. | |
| 5,455,126 A | 10/1995 | Bates et al. | |
| 5,498,489 A | 3/1996 | Dasgupta et al. | |
| 5,512,147 A | 4/1996 | Bates et al. | |
| 5,532,074 A | 7/1996 | Golben | |
| 5,540,741 A | 7/1996 | Gozdz et al. | |
| 5,547,782 A | 8/1996 | Dasgupta et al. | |
| 5,561,004 A | 10/1996 | Bates et al. | |
| 5,567,210 A | 10/1996 | Bates et al. | |
| 5,569,520 A | 10/1996 | Bates | |
| 5,571,634 A | 11/1996 | Gozdz et al. | |
| 5,584,893 A | 12/1996 | Mitchell | |
| 5,588,971 A | 12/1996 | Fauteux et al. | |
| 5,589,291 A | 12/1996 | Carlin et al. | |
| 5,591,544 A | 1/1997 | Fauteux et al. | |
| 5,597,659 A | 1/1997 | Morigaki et al. | |
| 5,597,660 A | 1/1997 | Bates et al. | |
| 5,612,152 A | 3/1997 | Bates | |
| 5,654,084 A | 8/1997 | Egert | |
| 5,778,515 A | 7/1998 | Menon | |
| 5,783,928 A | 7/1998 | Okamura | |
| 5,811,205 A | 9/1998 | Andrieu et al. | |
| 5,821,733 A | 10/1998 | Turnbull | |
| 5,928,436 A | 7/1999 | Borkowski et al. | |
| 5,932,375 A | 8/1999 | Tarcy et al. | |
| 6,001,139 A | 12/1999 | Asanuma et al. | |
| 6,033,796 A | 3/2000 | Baji | |
| 6,187,472 B1 | 2/2001 | Shiota et al. | |
| 6,197,450 B1 | 3/2001 | Nathan et al. | |
| 6,235,425 B1 | 5/2001 | Hanson et al. | |
| 6,284,406 B1 * | 9/2001 | Xing et al. | 429/96 |
| 6,709,778 B2 | 3/2004 | Johnson | |
| 6,737,180 B2 | 5/2004 | Johnson | |
| 2002/0071989 A1 | 6/2002 | Verma et al. | |

FOREIGN PATENT DOCUMENTS

| | | | |
|---|---|---|---|
| EP | 0 071 271 | | 2/1983 |
| EP | 0 168 062 | | 1/1986 |
| JP | 02-60049 | * | 2/1990 |
| JP | 02-60050 | * | 2/1990 |

OTHER PUBLICATIONS

Wang et al.; Characterization of Thin-Film Rechargeable Lithium Batteries with Lithium Cobalt Oxide Cathodes; (J. Electrochem. Soc., vol. 143, No. 10, Oct. 1996, pp. 3203-3213).

Fragnaud et al.; Thin-film cathodes for secondary lithium batteries; Journal of Power Sources 54 (1995) no month pp. 362-366.

Kenny et al.; The preparation and characterization of lithium cobalt oxide thin films by LPCVD; Materials Research Society vol. 415 (1996) no month pp. 213-217.

Schoonman et al.; Thin film solid electrodes for rechargeable lithium-ion batteries; Journal of Power Sources 68 (1997) no month pp. 65-68.

Chen et al.; Fabrication of LiCoO2 thin film cathodes for rechargeable lithium better by electrostatic spray pyrolysis; Solid State Ionics 80 (1995) no month pp. 1-4.

Chen et al.; Unique porous LiCoO2 thin layers prepared by electrostatic spray deposition; Journal of Materials Science 31 (1996) no month pp. 5437-5442.

Cole, Terry; Thermoelectric Energy Conversion with Solid Electrolytes; Science vol. 221 Sep. 2, 1983 pp. 915-920.

Feldman et al.; Heat pumps using organometallic liquid absorbents; AES-vol. 38, 1998 no month pp. 403-407.

Oxidation-Reduction Reactions; pp. 417-420.

* cited by examiner

US 7,960,054 B2

PACKAGED THIN FILM BATTERIES

REFERENCE TO RELATED APPLICATION

This is a continuation-in-part of U.S. patent application Ser. No. 10/047,407, now U.S. Pat. No. 7,204,862 filed Jan. 10, 2002.

TECHNICAL FIELD

This invention relates generally to thin film batteries, and more particularly to packaged thin film batteries and methods of packaging thin film batteries.

BACKGROUND OF THE INVENTION

The metal lithium of thin film batteries reacts rapidly upon exposure to atmospheric elements such as oxygen, nitrogen, carbon dioxide and water vapor. Thus, the lithium anode of a thin film battery will react in an undesirable manner upon exposure to such elements if the anode is not suitably protected. Other components of a thin film battery, such as a lithium electrolyte and cathode films, also require protection from exposure to air, although these components are commonly not as reactive as thin metal anode films. It should therefore be desirable to incorporate within a lithium or lithium intercalation compound battery, which includes an anode of lithium and other air-reactive components, a packaging system that satisfactorily protects the battery components from exposure to air.

Polymer batteries have been constructed in a manner in which the battery has a porous anode and cathode. The partially constructed battery cell is then placed within a protective "bag" which is sealed along three edges. Once the battery cell is positioned within the bag a liquid electrolyte is injected into the bag to occupy the space within the porous spacer between the anode and cathode. The open edge or forth edge of the bag is then heat sealed, as shown in U.S. Pat. No. 6,187,472. During the last steps of this process however air or other gases occupy spaces within the bag. These gases are entrapped within the bag once it is sealed. Much care must also be exercised during the sealing process to insure that the heat seal does not contact the battery cell within the bag as the heat will harm the polymer battery cell.

In the past packaging systems for batteries have been devised which included a shield which overlays the active components of the battery. These shields have been made of a ceramic material, a metallic material, and a combination of ceramic and metallic materials. The construction of thin film batteries however have proven to be quite difficult to produce and in providing an appropriate barrier as gas pockets may be capture between the anode and the protective layer during construction.

Another thin film battery packaging system has been devised wherein alternating layers of parylene and titanium are laid over the active components. The alternating layers are provided to restrict the continuation of pin holes formed in the layers during construction. This method of producing a protective layer has been difficult to achieve and has provided a protective layer which remains effective for only a short time.

It thus is seen that a need remains for a packaging system for thin film batteries which overcomes problems associated with those of the prior art. Accordingly, it is to the provision of such that the present invention is primarily directed.

SUMMARY OF THE INVENTION

In a preferred form of the invention, a method of sealing a battery cell having a top surface and peripheral edges, the method comprising the steps of positioning a packaging foil over the top surface of the battery cell, and heat sealing the packaging foil to the top surface of the battery cell.

DETAILED DESCRIPTION

Figure 1:
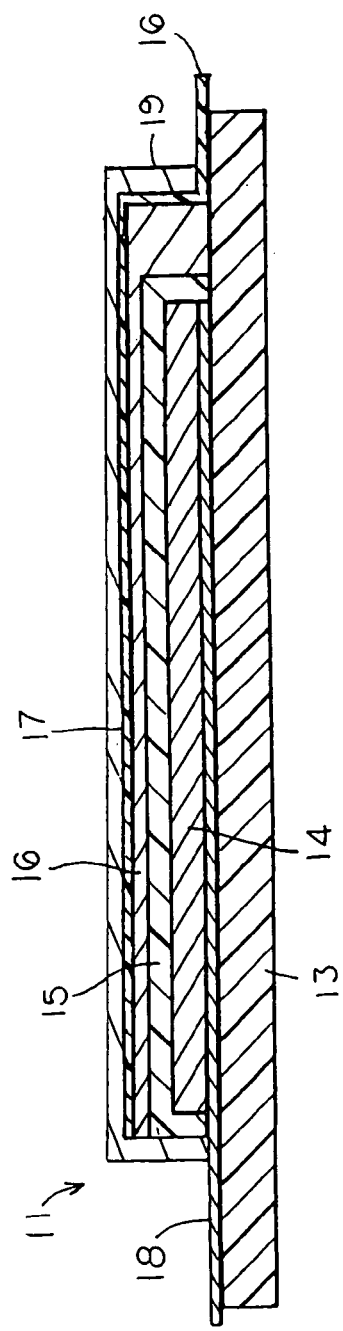
FIG. 1 is a cross-sectional side-view of a thin film battery cell.

With reference next to the drawings, there is shown in a packaged battery 10 embodying principles of the invention in a preferred form. The packaged battery 10 has a thin film lithium or lithium ion battery cell 11 encased within a packaging layer 12. The battery cell 11 includes a substrate 13, a cathode 14, an electrolyte 15, an anode 16, a passivation layer 19, a cathode anode current collector 18 and an anode current collector 17. The cathode 14 is made of a lithium metal or lithium intercalation compound, preferably a metal oxide such as $LiNiO_2$, $V_2O_5$, $Li_xMn_2O_4$, $LiCoO_2$ or $TiS_2$. The electrolyte 15 is preferable made of lithium phosphorus oxynitride, $Li_xPO_yN_z$. The anode 16 is preferably made of silicon-tin oxynitride, SiTON, when used in lithium ion batteries, or other suitable materials such as lithium metal, zinc nitride or tin nitride. Finally, an anode current collector 17 and cathode current collector 18 are preferably made of copper or nickel. The battery cell 11 is preferably manufactured in a manner described in detail in U.S. Pat. No. 5,561,004, which is specifically incorporated herein.

Figure 3:
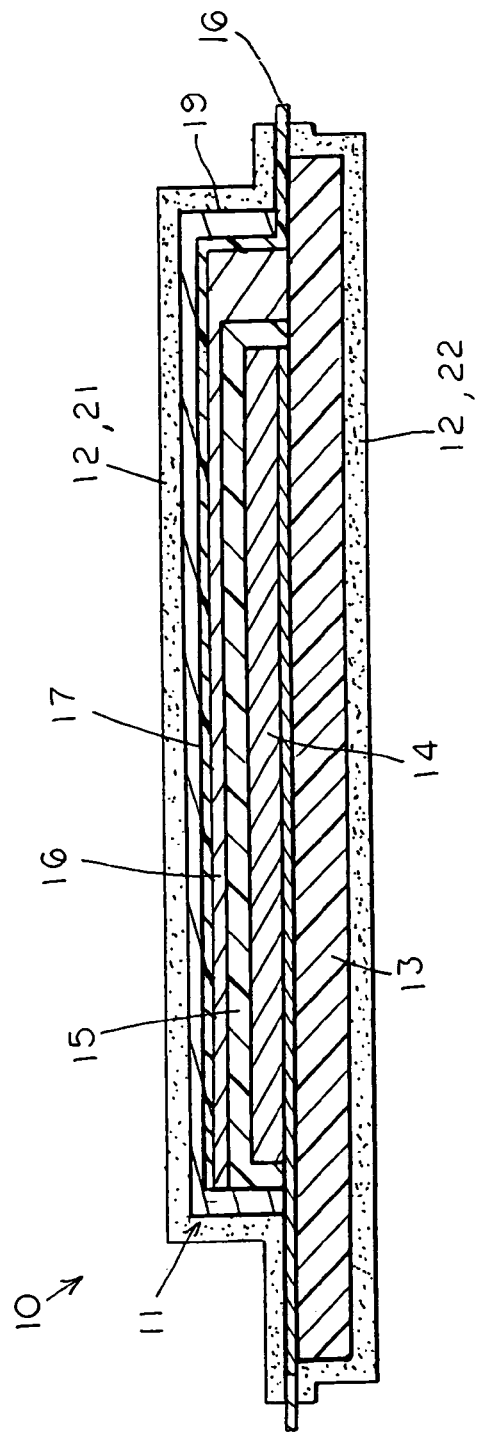
FIG. 3 is a partial cross-sectional side-view of the thin film battery cell and a pair of packaging foils and carriers shown subsequent to passing through a laminator.

With reference next to FIG. 3, to manufacture the battery 10 a bottom layer of packaging foil 21 is positioned to overlay the bottom surface of the substrate 13 while a top layer of packaging foil 22 is positioned to overlay the top surface of the passivation layer 19. The bottom and top layers of packaging foils 21 and 22 may be a laminated sheet of Class PPD or Class ECR packaging material made by Shield Pack, Inc. These packaging foils have an inward facing layer of polymer P1, an outwardly facing layer of polymer P2 and at least one intermediate layer of metal M, of course, the packaging foil may include several intermediate alternating layers of metal and polymer. A bottom sheet of carrier material 24 is positioned to overlay the bottom layer of packaging foil 21 while a top sheet of carrier material 25 is positioned to overlay the top layer of packaging foil 22. The carrier materials 24 and 25 may be 5 mil thick sheets of Kapton made by Dupont.

The battery cell 11, two layers of packaging foil 21 and 22, and two layers of carrier material 24 and 25 are then passed through a laminator having a pair of heaters 28 and a pair of pressure applying means in the form of lamination rollers 29. The packaging foils 21 and 22 become packaging layer 12 in the final product. The lamination rollers 29 are preferably made of a soft material such as rubber and are approximately 5 centimeter in diameter. The purpose of the carrier materials 24 and 25 is to provide an even pressure and temperature to the underlying packaging foil during the lamination process.

Figure 2:
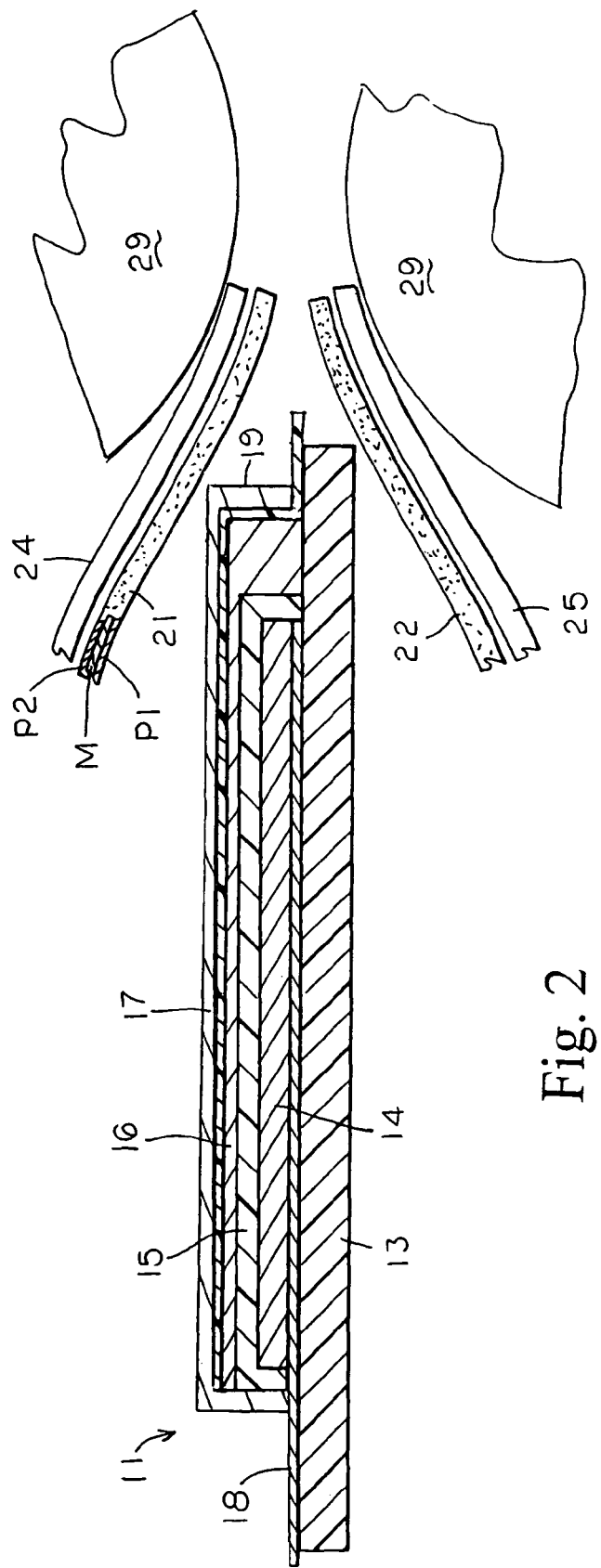
FIG. 2 is an illustration of the complete thin film battery having a protective packaging illustrating principles of the invention in a preferred embodiment, shown prior to passing through the laminator.

The temperature, pressure and rate of travel through the laminator causes the interior surface of the packaging foils 21 and 22 to be heat sealed to the corresponding surface of the battery cell 11 facing the packaging foils. As such, the interior surface of the bottom layer of packaging foil 21 is heat sealed to the bottom surface of the substrate 13 and the interior surface of the top layer of packaging foil 22 is heat sealed to the top surface of the passivation layer 19, as shown in FIG. 2. Although within the scope of the present invention many different combinations of temperature, pressure and material travel speeds through the laminator may be discovered which heat seals the packaging layers to the battery cell. However, it has been discovered that a temperature of 155 degrees Celsius, a pressure of 5 p.s.i and a travel speed of 25 cm/min for a Class PPD packaging material produces a proper heat seal between the packaging foils and the battery cell.

It has been discovered that by heat sealing the packaging foils directly to the battery cell the battery cell is provided with a substantially improved protective layer thereby improving the overall packaged battery. This improvement is achieved in part by the lamination process wherein as the packaging foils are heat sealed to the battery cell and as such occurs the gases between the foils and the battery cell are driven out. The use of packaging materials with the prior art batteries produced spaces between the battery cell and the packaging material, thereby allowing the capture of gases within these spaces which could degrade the components of the battery cell. The process of laminating the packaging material directly to the battery cell also creates a smaller overall battery, a problem which exists wherein the space occupied by the battery is intended to be as small as possible. Lastly, the lamination process causes the packaging material to be bonded to the side edges of the battery cell, thereby once again eliminating space between the battery cell and packaging material wherein harmful gases may in entrapped. This is enhanced by the softness and diameter of the lamination rollers 29 which determine the extent to which the packaging foil is forced against, and thereby sealed within, the side edges and inward corners of the battery cell.

It should be understood that while the present invention strives to laminate the exterior surfaces of the battery cell completely with the packaging material, the invention is not limited to such. However, it is desirous to laminate at least a majority of the top surface of the battery cell, the active material surface, so as to be in sealing engagement with the packaging foil, thereby eliminating virtually all gases therebetween. The packaging foil may be one sheet of packaging foil folded over itself or two separate sheets of packaging foil. Also, the laminating process may be carried out with the use of a platen laminator which consists of pressure applying means in the form of two oppositely disposed heated plates which are moved towards each other in pressing the material therebetween. The lamination process is considered to be a heat sealing process wherein the combination of heat and pressure causes a bonding of the packaging foil to the underlying cell.

Figure 4:
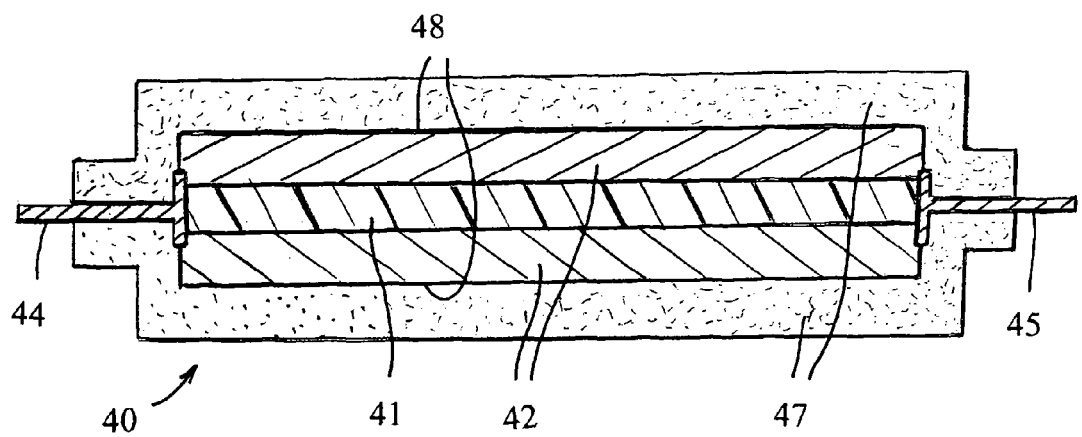
FIG. 4 is a cross-sectional side-view of the thin film battery cell and a pair of packaging foils in another preferred form of the invention.

With reference next to FIG. 4, there is shown a battery cell 40 having a substrate 41 and active cells 42 on opposite sides of the substrate. Each active cell includes the typical cathode, electrolyte and anode. The cell also includes a cathode contact 44 and an anode contact 45. The packaging foil 47 is positioned on opposite sides of the battery cell 40 and heat sealed to the top surface 48 of each active cell 42. The packaging material is thereby bonded to a majority of the top surface 48.

Figure 5:
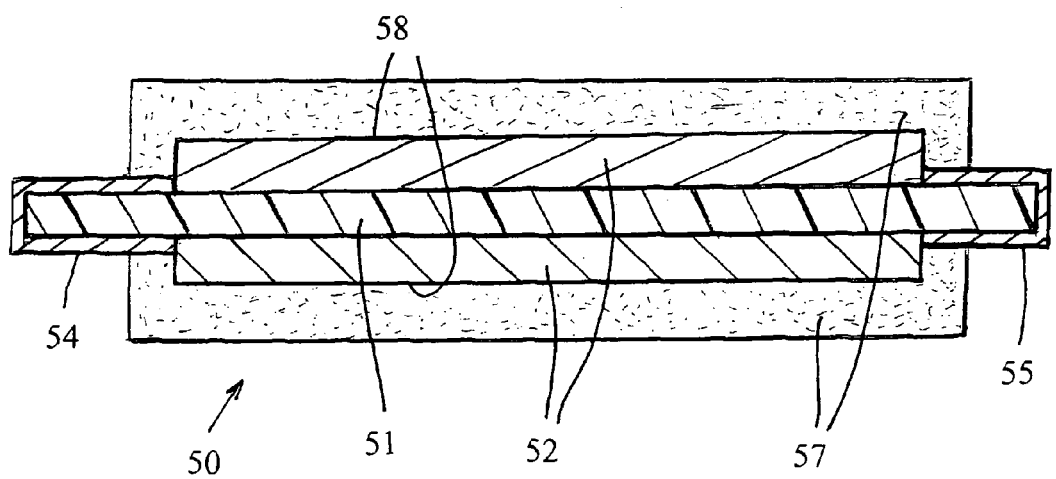
FIG. 5 is a cross-sectional side-view of the thin film battery cell and a pair of packaging foils in another preferred form of the invention.

With reference next to FIG. 5, there is shown a battery cell 50 having a substrate 51 and active cells 52 on opposite sides of the substrate. Each active cell includes the typical cathode, electrolyte and anode. The cell also includes a cathode contact 54 and an anode contact 55. The packaging foil 57 is positioned on opposite sides of the battery cell 50 and heat sealed to the top surface 58 of each active cell 52. The packaging material is thereby bonded to a majority of the top surface 58.

Figure 6:
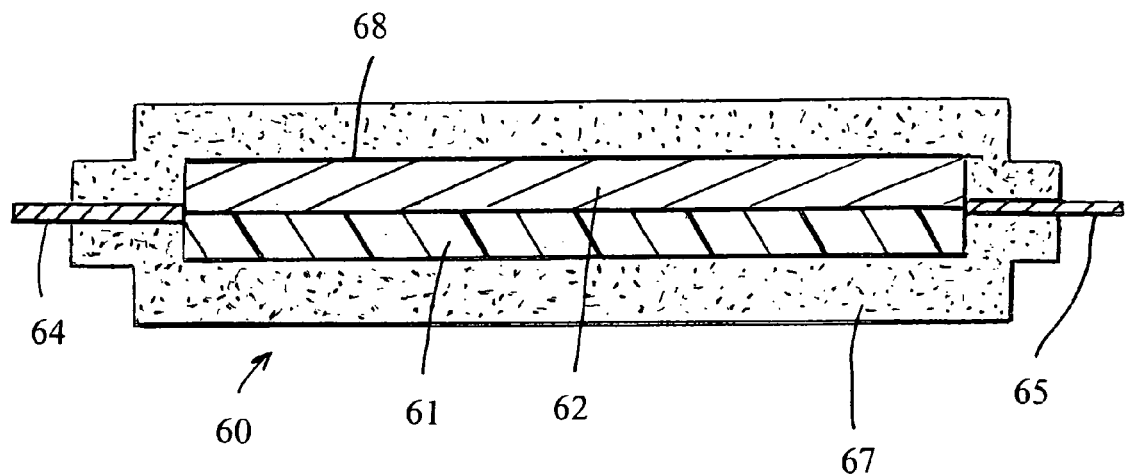
FIG. 6 is a cross-sectional side-view of the thin film battery cell and a pair of packaging foils in another preferred form of the invention.

With reference next to FIG. 6, there is shown a battery cell 60 having a substrate 61 and an active cell 62. The active cell 62 includes the typical cathode, electrolyte and anode. The cell also includes a cathode contact 64 and an anode contact 65. The packaging foil 67 is positioned on the battery cell 60 and heat sealed to the top surface 68. The packaging material is thereby bonded to a majority of the top surface 68.

Figure 7:
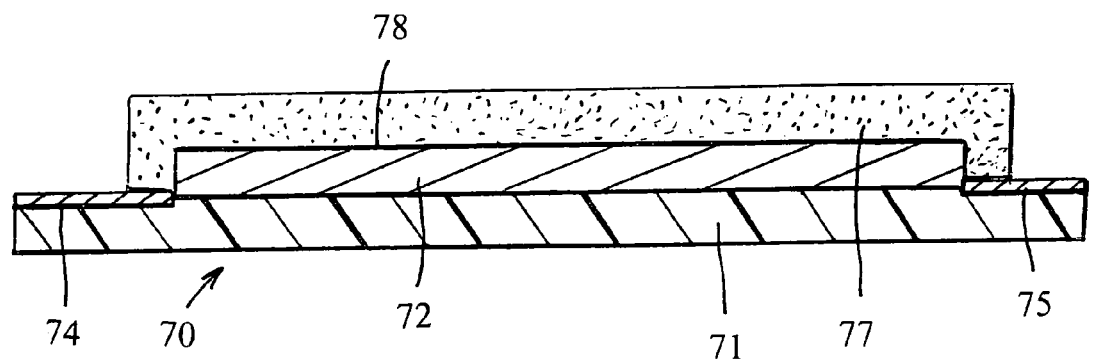
FIG. 7 is a cross-sectional side-view of the thin film battery cell and a pair of packaging foils in another preferred form of the invention.

With reference next to FIG. 7, there is shown a battery cell 70 having a substrate 71 and an active cell 72. The active cell 72 includes the typical cathode, electrolyte and anode. The cell also includes a cathode contact 74 and an anode contact 75. The packaging foil 77 is positioned on the battery cell 70 and heat sealed to the top surface 78. The packaging material is thereby bonded to a majority of the top surface 78.

It should also be understood that the present invention is not limited to the use of lithium ion batteries and that the invention may be utilized with many types of thin film battery cells. Also, the arrangement of the cathode, electrolyte and anode may be inverted as compared to that shown in the drawings.

Lastly, it should be understood that the battery cell utilized in practicing the invention is not required to be passivated, as the packaging material can be heat sealed directly to the anode or anode current collector.

It thus is seen that a packaged battery is now provided which is sealed to prevent unwanted exposure to gases. It should of course be understood that many modifications may be made to the specific preferred embodiment described herein, in addition to those specifically recited herein, without departure from the spirit and scope of the invention as set forth in the following claims.

The invention claimed is:

1. A thin film battery comprising:
   a battery cell having a cathode, an anode and an electrolyte, said battery cell having an exterior top surface and an exterior bottom surface;
   a packaging foil encapsulating said battery cell, said packaging foil is heat sealed to the majority of said exterior top surface and the majority of said exterior bottom surface of said battery cell.

2. The thin film battery of claim 1 wherein said packaging foil is comprised of multi-layered laminates which includes at least one metallic layer and at least one polymer layer.

3. A thin film battery comprising:
   a battery cell having a top surface, a bottom surface and peripheral side edges extending between said top surface and said bottom surface;
   a packaging foil heat sealed to the majority of said battery cell top surface and to the majority of said battery cell bottom surface.

4. The thin film battery of claim 3 wherein said packaging foil is also heat sealed to said battery cell side edges.

5. The thin film battery of claim 3 wherein said packaging foil is comprised of multi-layered laminates which includes at least one metallic layer and at least one polymer layer.

6. A thin film battery comprising:
a battery cell having an active portion including a cathode, an anode and an electrolyte;
a packaging foil overlaying said active portion, said packaging foil is heat sealed to the majority of the exterior surface of said battery cell active portion.

7. The thin film battery of claim 6 wherein said packaging foil is comprised of multi-layered laminates which includes at least one metallic layer and at least one polymer layer.

8. A thin film battery comprising:
a mounting substrate;
a battery cell mounted to said mounting substrate, said battery cell having an active portion including a cathode, an anode and an electrolyte, said active portion having a top surface opposite said substrate;
a packaging foil heat sealed to the majority of said top surface of said battery cell active portion.

9. The thin film battery of claim 6 wherein said packaging foil is comprised of multi-layered laminates which includes at least one metallic layer and at least one polymer layer.

* * * * *